US008221826B2

(12) United States Patent
Mellin et al.

(10) Patent No.: US 8,221,826 B2
(45) Date of Patent: Jul. 17, 2012

(54) METHOD FOR APPLYING ADHESIVE TO A WEB SUBSTRATE

(75) Inventors: André Mellin, Cincinnati, OH (US); Thomas Timothy Byrne, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 622 days.

(21) Appl. No.: 12/468,243

(22) Filed: May 19, 2009

(65) Prior Publication Data

US 2010/0297335 A1 Nov. 25, 2010

(51) Int. Cl.
*B32B 7/14* (2006.01)

(52) U.S. Cl. ...... 427/8; 427/208.6; 427/207.1; 427/275; 427/288; 156/64; 156/209; 156/291

(58) Field of Classification Search .................. 162/117, 162/132, 204; 156/64, 209, 291; 427/271, 427/275, 284–285, 288, 207.1, 208, 208.2, 427/208.4, 208.6, 208.8, 8
See application file for complete search history.

(56) References Cited

U.S. PATENT DOCUMENTS

| | | | | |
|---|---|---|---|---|
| 3,672,950 | A * | 6/1972 | Murphy et al. | 428/154 |
| 3,867,225 | A | 2/1975 | Nystrand | |
| 5,443,889 | A | 8/1995 | Ruppel et al. | |
| 5,505,777 | A * | 4/1996 | Ciardella et al. | 118/663 |
| 6,129,972 | A * | 10/2000 | McNeil et al. | 428/154 |
| 7,282,108 | B2 | 10/2007 | Mansson et al. | |

FOREIGN PATENT DOCUMENTS

| | | |
|---|---|---|
| EP | 738588 | 10/1996 |
| EP | 796727 | 9/2002 |

* cited by examiner

*Primary Examiner* — Frederick Parker
*Assistant Examiner* — Alex Rolland
(74) *Attorney, Agent, or Firm* — Peter D. Meyer

(57) ABSTRACT

A process for determining the placement of an adhesive relative to an emboss pattern is disclosed. The disclosed process is suitable for forming an embossed multi-ply substrate. The process comprises the steps of: 1. Providing the emboss pattern as a pattern of elements; 2. Providing a grid comprising a plurality of vertices, the grid corresponds to an adhesive application pattern; 3. Providing each vertex of the plurality of vertices with an initial position; and, 4. Overlaying said emboss pattern upon said grid.

17 Claims, 10 Drawing Sheets

METHOD FOR APPLYING ADHESIVE TO A WEB SUBSTRATE

FIELD OF THE INVENTION

The present disclosure describes and claims a method for optimizing the application of an adhesive to an embossed web substrate in order to form a multi-ply material.

BACKGROUND OF THE INVENTION

Absorbent paper products, such as paper towels, facial tissues, and other similar products, are designed to include several important properties. For example, the product should have good bulk, a soft feel, and should be highly absorbent. The product should also have good strength even while wet and should resist tearing. Unfortunately, it is difficult to produce a high-strength paper product that is also soft and highly absorbent. Usually when steps are taken to increase one property of the product, other characteristics of the product are adversely affected.

In order to produce such absorbent paper products, it is common to laminate two or more tissue plies in order to produce the final tissue product. A laminated product is typically more flexible and softer when compared to one single ply having a comparative thickness and basis weight. Further, a laminated product is typically provided with better absorbent capacity and bulk.

The lamination of two or more plies is often made by means of gluing. In such products, a mechanical embossing of at least one of the plies is often performed prior to any gluing step.

Typical manufacturing processes include first embossing two paper plies in a three-dimensional structure with alternating raised and recessed portions. After embossing, an adhesive is applied to one of the plies, and the two plies are joined in a press nip between two embossing rolls. This results in the raised portions of the respective plies being adhesived to each other. Similar processes are described in EU Patent Nos. 796,727 and 738,588.

Another process for laminating two paper plies provides each ply being fed over a pattern roll. The pattern rolls are provided with alternating raised and recessed portions. Adhesive is applied to one ply as it traverses over the roll. The two resulting plies are then adhesively bonded together in a nip disposed between the two pattern rolls. The pattern rolls are in register with each other so that a joining and compression of the paper plies occur in a pattern corresponding to the protuberances disposed upon the pattern rolls. Processes like this are described in U.S. Pat. No. 5,443,889.

Alternatively, some processes apply adhesive to a tissue ply disposed in a press nip between a first pattern roll and an impression roll. The ply is eventually laminated to another ply in a press nip between the same impression roll and a second pattern roll having a pattern corresponding with that of the first pattern roll and driven in registry with the first pattern roll. Such processes are disclosed in U.S. Pat. Nos. 3,672,950; 3,867,225; and 7,282,108 B2.

In any regard, significant amounts of adhesive are typically required to bond the various plies together in a multi-ply structure. Traditionally, the entire emboss is coated with an adhesive and then bonded to an adjacent ply. This results in a structure that is significantly stiffer than would be preferred by consumers. Additionally, coating the entire embossment requires the use of significant quantities of adhesive. This results in higher production costs. Net—you are left with a product that is expensive to produce and is not necessarily consumer preferred.

Accordingly, it would be significantly advantageous to provide for the gluing of two adjacent layers of an embossed substrate which reduces the overall amount of adhesive required to complete the emboss process, thereby reducing the cost of manufacturing. This would also increase the favorability of the finally produced product with consumers.

SUMMARY OF THE INVENTION

A first non-limiting embodiment of the present disclosure provides a process for determining the placement of an adhesive relative to an emboss pattern is disclosed. The disclosed process is suitable for forming an embossed multi-ply substrate. The process comprises the steps of: 1. Providing the emboss pattern as a pattern of elements; 2. Providing a grid comprising a plurality of vertices, the grid corresponds to an adhesive application pattern; 3. Providing each vertex of the plurality of vertices with an initial position; and, 4. Overlaying said emboss pattern upon the grid.

Another non-limiting embodiment of the present disclosure provides a process for determining the placement of an adhesive relative to an emboss pattern comprising the steps of: 1. Providing the emboss pattern as a pattern of elements; 2. Providing a grid comprising a plurality of vertices, the grid corresponding to an adhesive application pattern; 3. Providing each vertex of the plurality of vertices with an initial position; 4. Translating a first vertex of the plurality of vertices proximate to a first element of the pattern of elements from the initial position to a second position overlaying the first element of the pattern of elements in a first direction corresponding to an axis forming a Cartesian coordinate system; 5. Translating a second vertex of the plurality of vertices proximate to the first element of the pattern of elements from the initial position to a second position overlaying the first element of the pattern of elements in a second direction corresponding to an axis forming a Cartesian coordinate system; 6. Comparing a distance between the first vertex and a second vertex of the plurality of vertices disposed adjacent the first vertex and overlaying the first element of the pattern of elements; and, 7. Translating the second vertex to a third position overlaying the first element of the pattern of elements if the distance between the first vertex and a second vertex is less than a radius, r, of a circle disposed about the first vertex.

Yet another non-limiting embodiment of the present disclosure provides a process for determining the placement of an adhesive relative to an emboss pattern comprising the steps of: 1. Providing the emboss pattern as a pattern of elements; 2. Providing a grid comprising a plurality of vertices, the grid corresponding to an adhesive application pattern; 3. Providing each vertex of the plurality of vertices with an initial position; 4. Translating a first vertex of the plurality of vertices proximate to a first element of the pattern of elements from the initial position to a second position overlaying the first element of the pattern of elements; 5. Translating a second vertex of the plurality of vertices proximate to a second element of the pattern of elements from the initial position to a second position overlaying the second element of the pattern of elements; 6. Comparing a distance between the first vertex and a second vertex of the plurality of vertices disposed adjacent the first vertex and overlaying the second element of the pattern of elements; and, 7. Translating the second vertex to a third position overlaying the second element of the pattern of elements if the distance between the first vertex and a second vertex is less than a radius, r, of a circle having disposed about the first vertex.

DETAILED DESCRIPTION

It would be understood by one of ordinary skill in the art that the present disclosure is a description of exemplary embodiments. The instant disclosure should not be intended as limiting but broader aspects of the present invention are embodied in the exemplary constructions.

The process of the present invention generally involves the production of a web substrate having at least one surface provided with an embossing pattern on the surface thereof. By way of non-limiting example, a tissue product may be an uncreped through air-dried paper web that has been formed on a three-dimensional surface in a manner that produces surface texture. In this example, a fibrous structure comprises contacting a molding member comprising a design element with a fibrous structure such that the design element is imparted to the fibrous structure. The molding member may be a belt that comprises a design element. Alternatively, a paper web may be processed after formation through an embossing system to provide a three-dimensional texture to the resulting structure. A design element can be imparted to a fibrous structure comprises passing a fibrous structure through an embossing nip formed by at least one embossing roll comprising a design element such that the design element is imparted to the fibrous structure.

In any regard, to provide for the multi-ply substrate, an adhesive is applied to the embossment formed on the resulting paper substrate, and the resulting tissue webs are bonded in super posed relation to produce a laminated product.

As mentioned previously, bonding is typically affected by disposing an adhesive between the webs in accordance with a pattern of application. Typically, the adhesive may be a thermoplastic resin. Polyvinyl alcohol in an aqueous medium is one such example.

Figure 1:
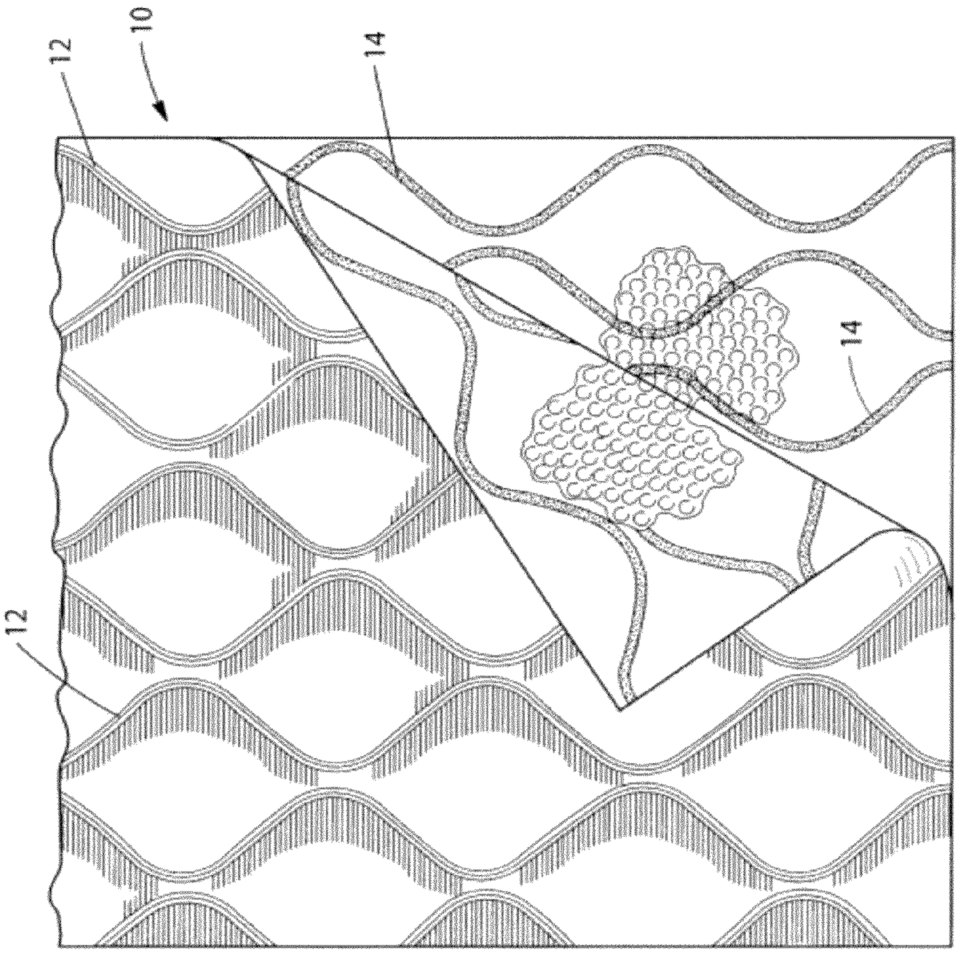
Fig. 1 PRIOR ART
FIG. 1 is a break-away top plan view depicting one strategy of applying an adhesive for bonding two plies of a laminated and embossed sheet structure in the prior art.

FIG. 1 depicts a prior art example of an embossed and adhesively contacted two-ply substrate 10. A first sheet having an emboss pattern 12 disposed thereon is provided in a face-to-face relationship with a second sheet provided with a pattern of lines 14 disposed thereupon. These lines may be continuous or discontinuous or a combination thereof.

Figure 2:
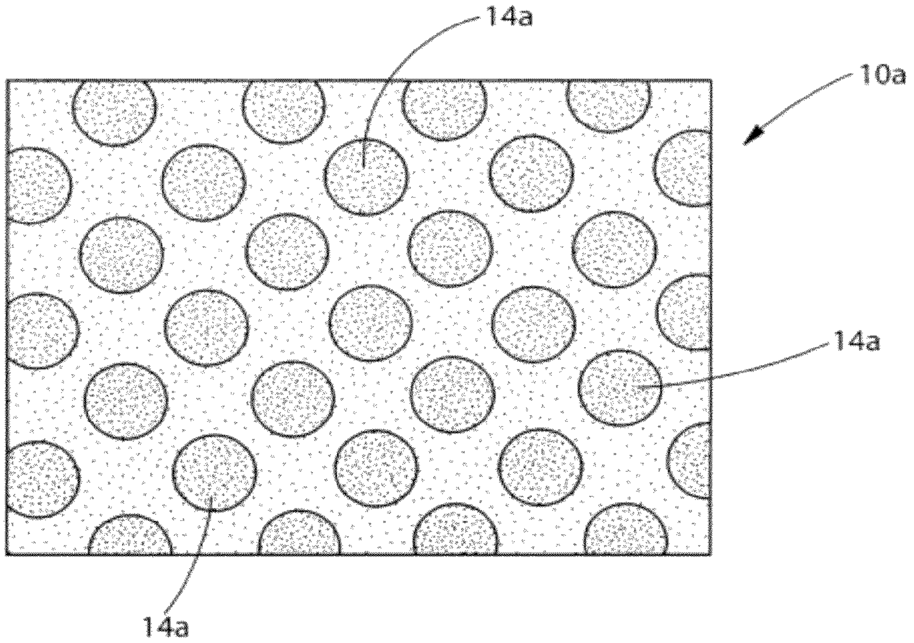
Fig. 2 PRIOR ART
FIG. 2 is a top plan view of yet another adhesive application strategy for multi-ply embossed paper product of the prior art.

FIG. 2 is a representative prior art pattern used for applying a bonding material to a tissue web. The pattern 10A is represented by a succession of discrete adhesive dots 14A. As depicted, the dots 14A can be spaced so that there are approximately from about 25 to 35 dots 14A per inch in the machine direction or the cross-machine direction. The dots 14A may be provided with a diameter of from about 0.01 inches to about 0.03 inches. The dots 14A can be present in the pattern so that approximately 28 dots per inch extend in either the machine direction or the cross-machine direction. In one embodiment, the dots 14A can cover from about 20% to about 30% of the surface area of one side of the paper web. The pattern of dots is applied as shown to one surface of a web substrate and subsequently contacted with another web substrate to form a multi-ply material.

Figure 3:
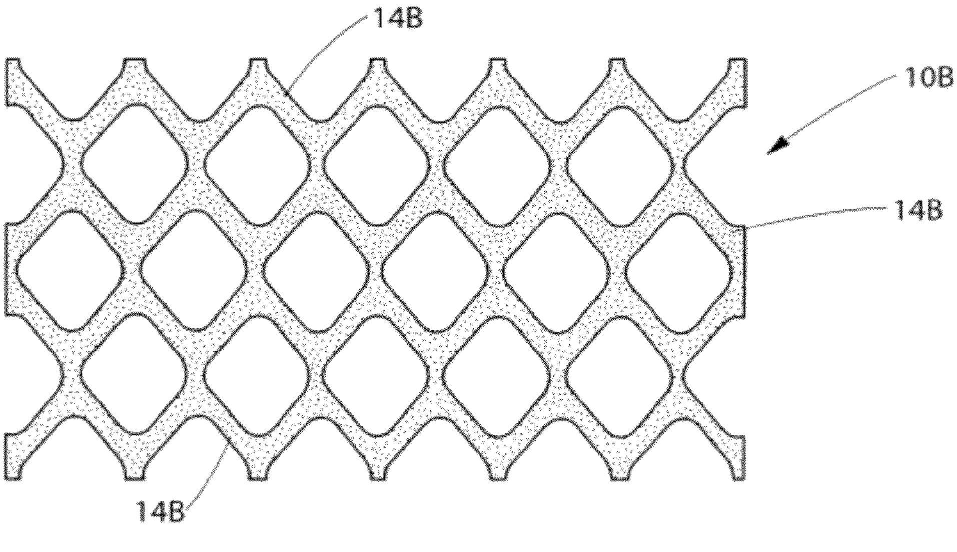
Fig. 3 PRIOR ART
FIG. 3 is a top plan view of yet another strategy for the application of an adhesive in order to effectuate the bonding of plies in a multi-ply structure of the prior art.

Yet another scheme to adhesively bond the plies of a multi-ply substrate is shown in FIG. 3. This prior art pattern applies the bonding material to a paper web 10B. The adhesive pattern 14B is provided as a reticulated grid. The reticulated pattern can be provided in the shape of diamonds as shown. Ostensibly, the reticulated pattern is alleged to provide more strength to the web in comparison to patterns that are made up on a succession of discrete shapes.

Figure 4:
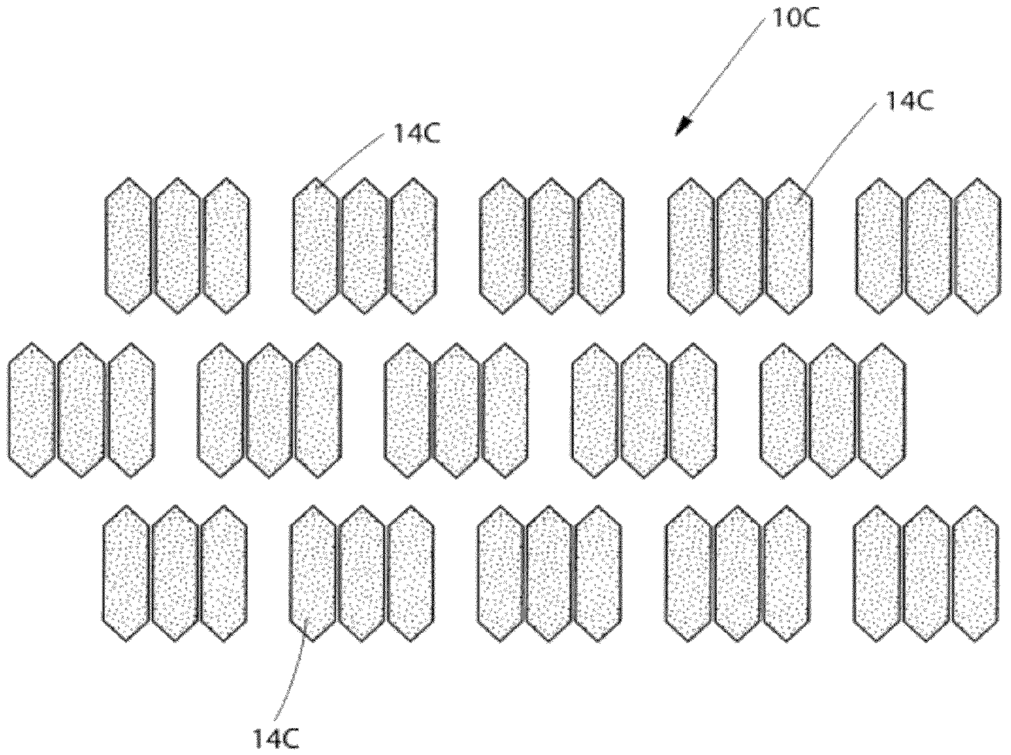
Fig. 4 PRIOR ART
FIG. 4 is a top plan view of yet another scheme of the application of adhesive to bond adjacent plies of a multi-ply structure of the prior art.

Still yet another scheme utilized by the prior art is depicted in FIG. 4. The adhesive pattern 10C is provided as a plurality of discrete shapes that are each comprised of three elongated hexagons. As described and shown, the hexagons can be about 0.02 inches long and can have a width of about 0.006 inches. The prior art seeks to provide approximately 35 to 40 hexagon groups as shown per inch. It can be spaced in the machine direction and cross-machine direction. As described, the pattern covers from about 40% to about 60% of the surface area of one side of the web.

However, the schemes used by the prior art to adhesively bond the plies of a multiple ply substrate use significant amounts of adhesive and have complex patterns that require complex equipment to provide the adhesive to the resulting substrate. It would be realized by one of skill in the art that the process of the present invention greatly simplifies the application of adhesive to an embossed substrate to provide for a multiple ply material. Likewise, the present invention significantly reduces the amount of adhesive necessary to effectuate bonding of adjacent plies in an embossed multi-ply product substrate.

As used herein, the term "machine direction" references the primary direction of travel though any manufacturing and/or processing equipment used to manufacture a paper product of the present invention. The "cross-machine direction" references the direction perpendicular and co-planar to the machine direction.

As used herein, the term "continuous" refers to an embossing pattern, including an embossing element, that extends continuously along at least one path without a break or interruption; that is, one can trace along the entirety of the continuous embossing pattern without ever having to cross a break or interruption in the pattern.

As used herein, the term "linear", as it refers to embossing elements, means that the embossing element has a dimension in one direction parallel to the surface or plane from which it extends that is longer than any other dimension of the element in another direction also parallel to the surface or plane from which it extends. More specifically, the term "linear" refers to embossing elements that have a length and a width wherein the ratio of the length to width is at least about 4:1; alternatively, about 5:1; or at least about 10:1. Further, a linear element could be continuous as described herein. For the purposes of this application, the length of a linear embossing element is measured along a path that substantially corresponds to a longitudinal center line of the embossing element, and the width is measured generally perpendicular to the longitudinal center line. If the linear embossing element is in the form of an outline of a shape such as, for example, a square or a curvilinear shape, the length of the linear embossing element is taken along the horizontal center line of the raised portions of the linear embossing element (e.g., the portions making up the outline of the shape) as opposed to the longitudinal center line of the area of embossing element included in the unraised portions. Thus, the length will generally correspond to the length of the center line of the outline of the shape formed by the linear embossing element as opposed to a distance bisecting or otherwise cutting across a portion of the shape.

The term "linear" does not require that the embossing element be of any particular shape other than as set forth herein. It is contemplated that such linear embossing elements can include generally straight lines or curvilinear lines or combinations thereof. In addition, a linear element need not be uniform in width and/or height. For purposes of this application, the width measurement used to determine the length-to-width ratio is the widest or largest width measurement taken along the length of the embossing element. Further, linear embossing elements can form patterns and/or shapes that repeat or do not repeat. Thus, the pattern, if any, formed by the linear embossing elements can be regular or non-regular, as desired.

In certain embodiments, it may be desirable for the apparatus to produce embossments to include an embossing member (e.g., an embossing plate or roll) having discrete embossing elements that mate with linear embossing elements from a corresponding plate or roll. In yet other embodiments, it may be desirable for the apparatus to include two embossing members each having linear embossing elements that mate with each other. In still yet another embodiment, it may be desirable for the apparatus to include embossing members one or more of which have a combination of discrete and linear embossing elements.

A typical embossing apparatus may include a pair of rolls, such as a first embossing roll and second embossing roll. It should be realized that the apparatus could comprise a plurality of plates, cylinders, or other equipment suitable for embossing webs. In any regard, the exemplary embossing rolls are generally disposed adjacent to each other in order to provide a nip. The rolls are typically configured so as to be rotatable on an axis—the respective axes of the embossing rolls being generally parallel to one another. Each roll may be provided with a plurality of protrusions or embossing elements generally arranged in a pattern. The embossing rolls and the corresponding elements disposed upon the embossing rolls may be made out of any material suitable for the desired embossing process. This can include, without limitation, steel and other metals, ebonite, plastics, ceramic, and hard rubber, or any combination thereof.

Figure 5:
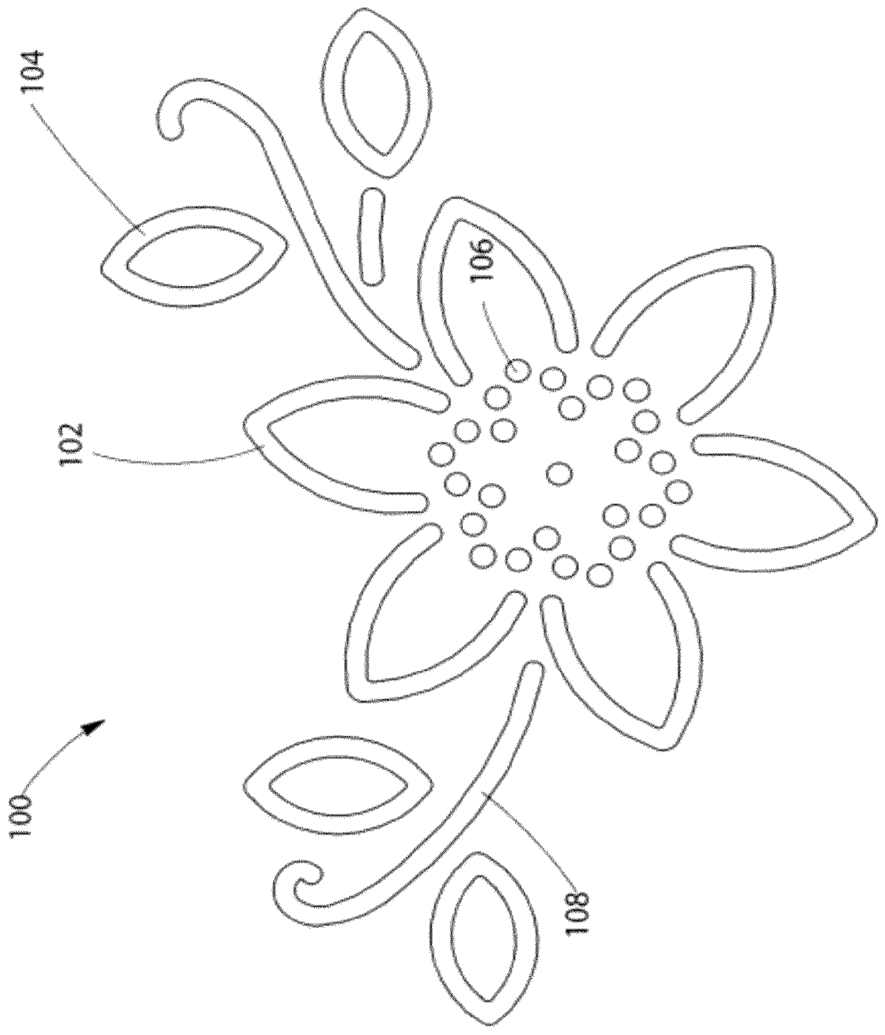
FIG. 5 is a top plan view of an exemplary embossment design suitable for use with a multi-ply tissue structure produced according the present invention.

FIG. 5 shows an exemplary embossing pattern suitable for use of the process of the present invention. The exemplary, but non-limiting, embossing pattern 100 may comprise a plurality of linear and non-linear elements. By way of non-limiting example, embossing pattern 100 may comprise linear elements forming an open loop 102, a linear element forming a closed loop 104, a non-linear element 106, and a curvilinear element 108. However, it should be realized by one of skill in the art that any combination of linear, non-linear, and curvilinear elements may be used to provide an embossing pattern suitable for use with the process of the instant invention.

Figure 6:
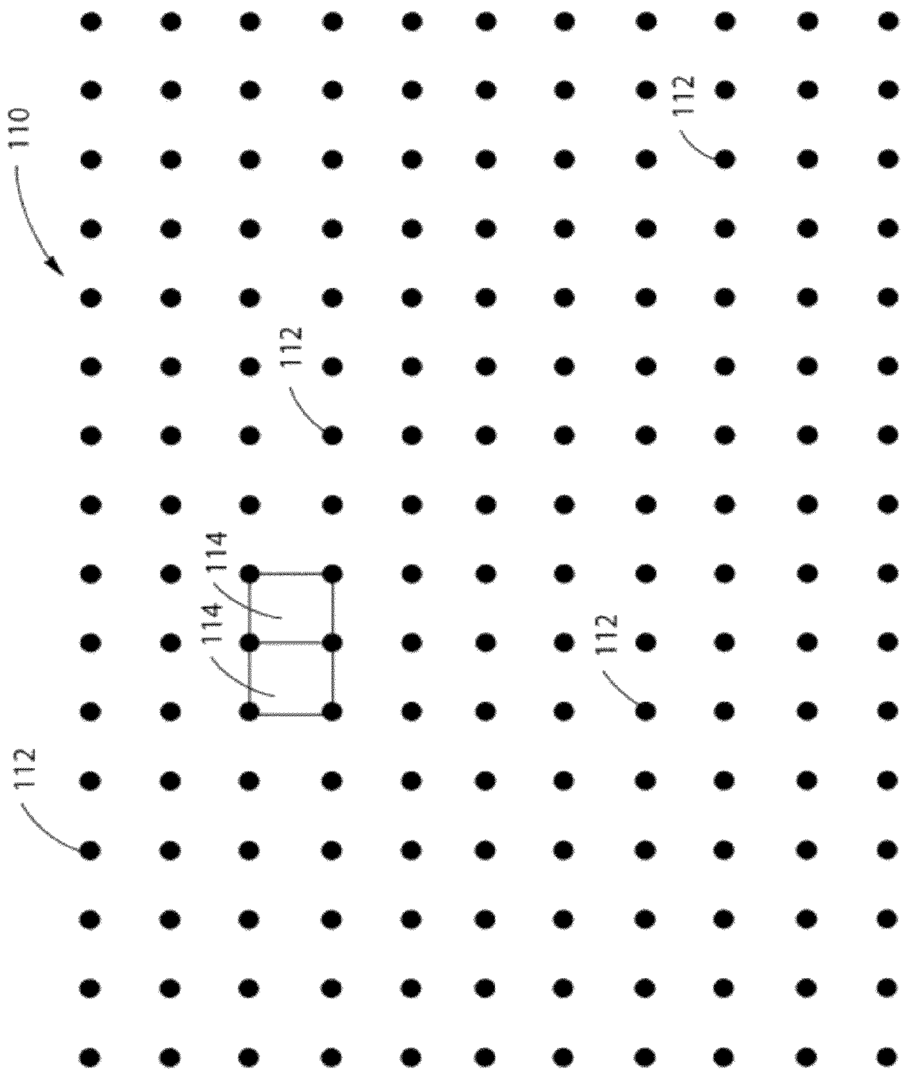
FIG. 6 is a top plan view of an exemplary grid suitable for use with the present invention.

FIG. 6 provides a grid 110 comprising a plurality of vertices forming a plurality of adjacent rectangles disposed in Cartesian space. Each vertex 112 represents the initial starting point of a representative adhesive application to a representative embossed web substrate prior to adhesion of the embossed web substrate to another ply forming a multi-ply product.

While the representative grid 110 comprising vertices 112 is depicted herein as forming a plurality of rectangles 114, it should be realized by one of skill in the art that the grid 110 could comprise a plurality of vertices 112 forming any desired shape. For example, the plurality of vertices 112 could be arranged to provide for a grid 110 forming triangles, pentagons, hexagons, heptagons, octagons, nonagons, and the like. While the arrangement of the vertices 112 within each grid 110 is not important, it should be realized that the grid 110 comprising vertices 112 be provided in a manner consistent with the most efficacious application of adhesive to an embossed web substrate consistent with the present invention. As depicted, each vertex 112 comprising grid 110 that form rectangles 114 provides a very simple basis for explaining the concepts of the present invention for the application of adhesive to an embossed substrate in order to form the multi-ply substrate and should therefore be considered as non-limiting.

One of skill in the art will also appreciate that the grid 110 comprising vertices 112 may comprise discrete regions having a differential density of vertices 112. By way of non-limiting example, it may be perfectly acceptable to provide a densified region of vertices 112 in grid 110 that is proximate to, or may likely be proximate to, embossing pattern 100. By way of non-limiting example, other regions of vertices 112 of grid 110 may be less dense if the vertices 112 comprising grid 112 are not proximate to an embossing pattern 100. In any regard, one of skill in the art would be able to utilize a grid 110 having any arrangement of vertices 112 that provides the most efficacious application of an adhesive to a resulting web substrate. Such densified regions of vertices 112 may comprise at least two adjacent vertices 112 comprising grid 110 and may be arranged in any manner as appropriate in order to provide adhesion between the plies of a multi-ply web substrate. Additionally, any number of vertices 112 comprising grid 110 may be disposed within any densified or any undensified region.

Figure 7:
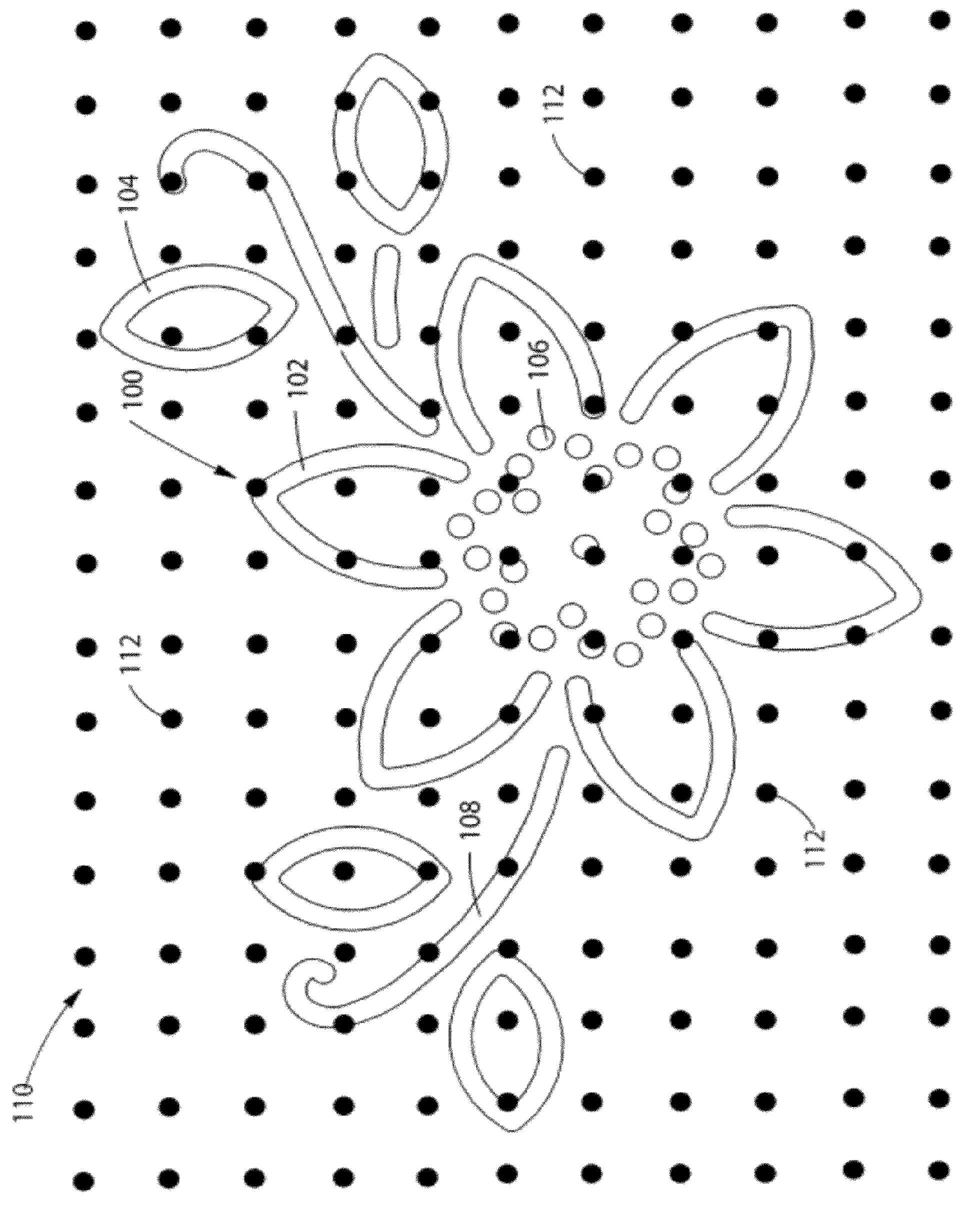
FIG. 7 is a top plan view of the emboss pattern of FIG. 5 overlaid upon a grid pattern depicted in FIG. 6.

As shown in FIG. 7, the embossing pattern 100 of FIG. 5 is overlaid upon the grid 110 of FIG. 6. Some of the vertices 112 forming grid 110 may coincidentally overlap with respective elements forming embossing pattern 100. However, it should be realized by one of skill in the art that it is not necessary that any of the vertices 112 forming grid 110 have any coincidental overlap with any of the elements forming embossing pattern 100.

Figure 8:
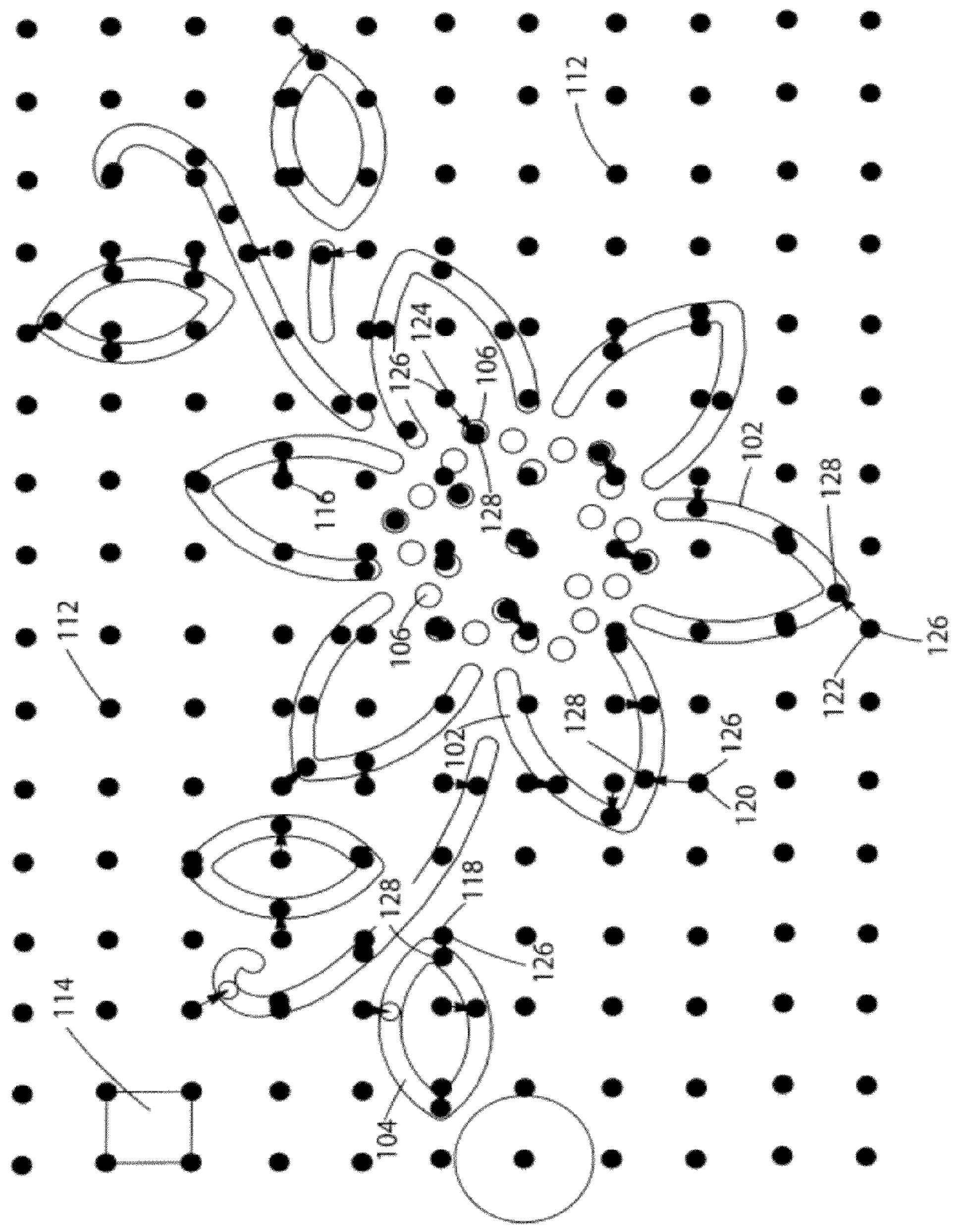
FIG. 8 is a top plan view of the emboss pattern overlaying the grid pattern of FIG. 7 where certain elements of the grid pattern have been translated.

As shown in FIG. 8, an exemplary vertex 116 is translated from its initial starting position within grid 112 to a position corresponding with a particular element—in this case, a linear element forming an open loop 102 of embossing pattern

100. In short, generally, the exemplary vertex 116 or any of the vertices 112 forming grid 112 is translated to the element forming embossing pattern 100 which is closest to that particular emboss element. In a preferred embodiment, each vertex 112 that requires a positional translation in order to correspond to a particular element forming embossing pattern 100 is shifted in only one direction, as represented in Cartesian coordinates. The preferred translation then is only provided relative to the X-direction or relative to the Y-direction which are the primary axes representative of Cartesian space. The X-direction and Y-directions referenced herein may be representative of the cross-machine and machine direction respectively. Although one of skill in the art will realize that any system of vertices 112 chosen can be provided with an exemplary set of axes in Cartesian space. In any regard, the resulting translation should be provided in only one direction parallel to one of the axis representing the system of vertices 112 in Cartesian space.

By way of non-limiting example, exemplary vertex 116 disposed in grid 110 is translated only in the X-direction of Cartesian space into a position overlying the linear element forming an open loop 102 of embossing pattern 100. In a second exemplary but non-limiting embodiment, second exemplary vertex 118 is translated from a first position 126 along the X-axis of Cartesian space to second position 128, thereby providing second exemplary vertex 118 to overlay the linear element forming a closed loop 104 of embossing pattern 100. As depicted in yet another non-limiting embodiment, third exemplary vertex 120 is translated from a first position 126 along the Y-axis of Cartesian space to a second position 128 into a position overlaying a linear element forming an open loop 102 of embossing pattern 100.

In sum, any singular vertex 112 disposed in grid 100 is preferably translated in either one of the X- or Y-direction defining Cartesian space from a first position 126 representing the initial starting position of the vertex 112 within grid 110 to a second position 128, thereby overlaying one of the elements forming embossing pattern 100 when the vertex 112 is disposed in a grid forming a plurality of rectangles 114, as shown in FIG. 8. It should be realized that one of skill in the art would be able to arrange for various forms of translation of the various vertices 112 forming any grid 110 whether or not each of the vertices provided to form a grid define the respective corners of a rectangle 114 or any other geometric shape suitable for use with the present invention. These respective translations may incorporate a translation along a single axis or along multiple axes representing the Cartesian coordinates of the representative grid. In the circumstance where a particular vertex 12 is disposed between adjacent elements forming embossing pattern 100, the vertex 112 is preferably translated to the element nearest the particular vertex 112.

In the event an embossing pattern 100 comprises non-linear elements 106 (i.e., the exemplary non-linear elements are provided herein as a singular discrete embossing element), the method of the present invention preferably translates an adjacent vertex 112 into direct overlayment with the non-linear element 106 by relocating the particular vertex 112 from a first position 126 to a second position 128 directly overlaying the non-linear element 106 forming a portion of embossing pattern 110. As would be known to one of skill in the art, this may require the translation of the vertex 112 along any combination of X- and Y-axes disposed in Cartesian space and defined by the grid 110 comprising vertices 112.

Figure 9:
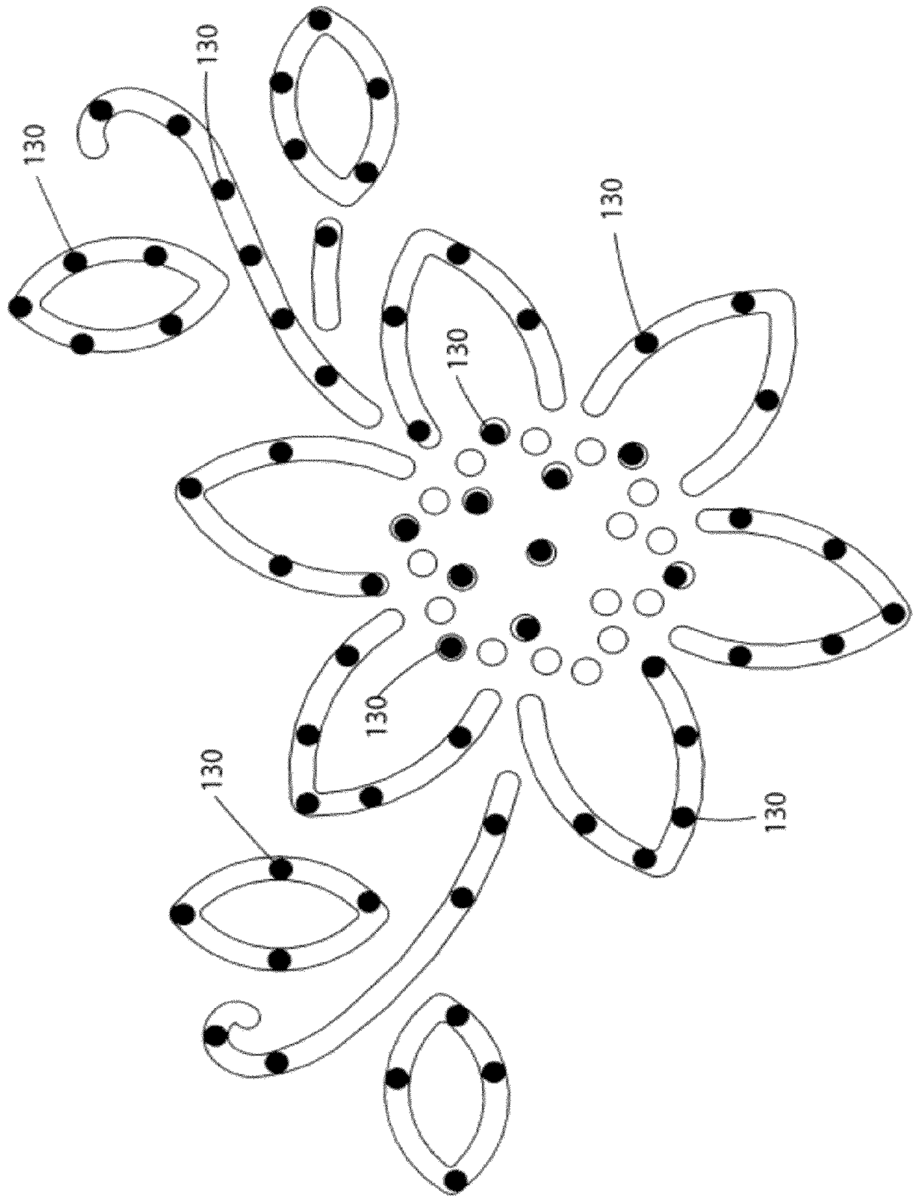
FIG. 9 is a top plan view of the finally translated grid pattern of FIG. 8 showing the final placement of the respective grids associated with exemplary emboss pattern of FIG. 5.

Additionally, as required by one of skill in the art, an embossing pattern 100 having linear and non-linear elements disposed therein may require yet another translation of a vertices 112 into a position overlaying a portion of the embossing pattern 100 due to purely mechanical and aesthetic reasons. In this way, fourth exemplary vertex 122 can be translated from a first position 126 to a second position 128 overlaying the particularized position upon the linear element forming an open loop 102 of embossing pattern 100. Since the linear element forming open loop 102 has a portion distal from the center of embossing pattern 110, it may be deemed by one of skill in the art that the placement of adhesive at this point may provide some benefit in the form of securing the web material having the embossing pattern 100 disposed thereon to a second web material. This translation of the fourth exemplary vertex 122 from a first position 126 to second position 128 overlaying the linear element forming open loop 102 may require the translation to comprise both X-direction and Y-direction components representative of Cartesian space. While these adjustments may be deemed necessary by one of skill in the art to best effectuate bonding between the plies of a multi-ply substrate, it should be recognized that the translations required in order to provide vertices 112 in a position overlaying a respective element forming embossing pattern 100 should occur, then only one of either the X- or Y-directions representing Cartesian space and as defined by the grid 110 comprising vertices 112. The resulting translation of respective translated vertices 130 into an overlaying position of both linear and non-linear elements forming embossing pattern 100 is shown in FIG. 9.

Figure 10:
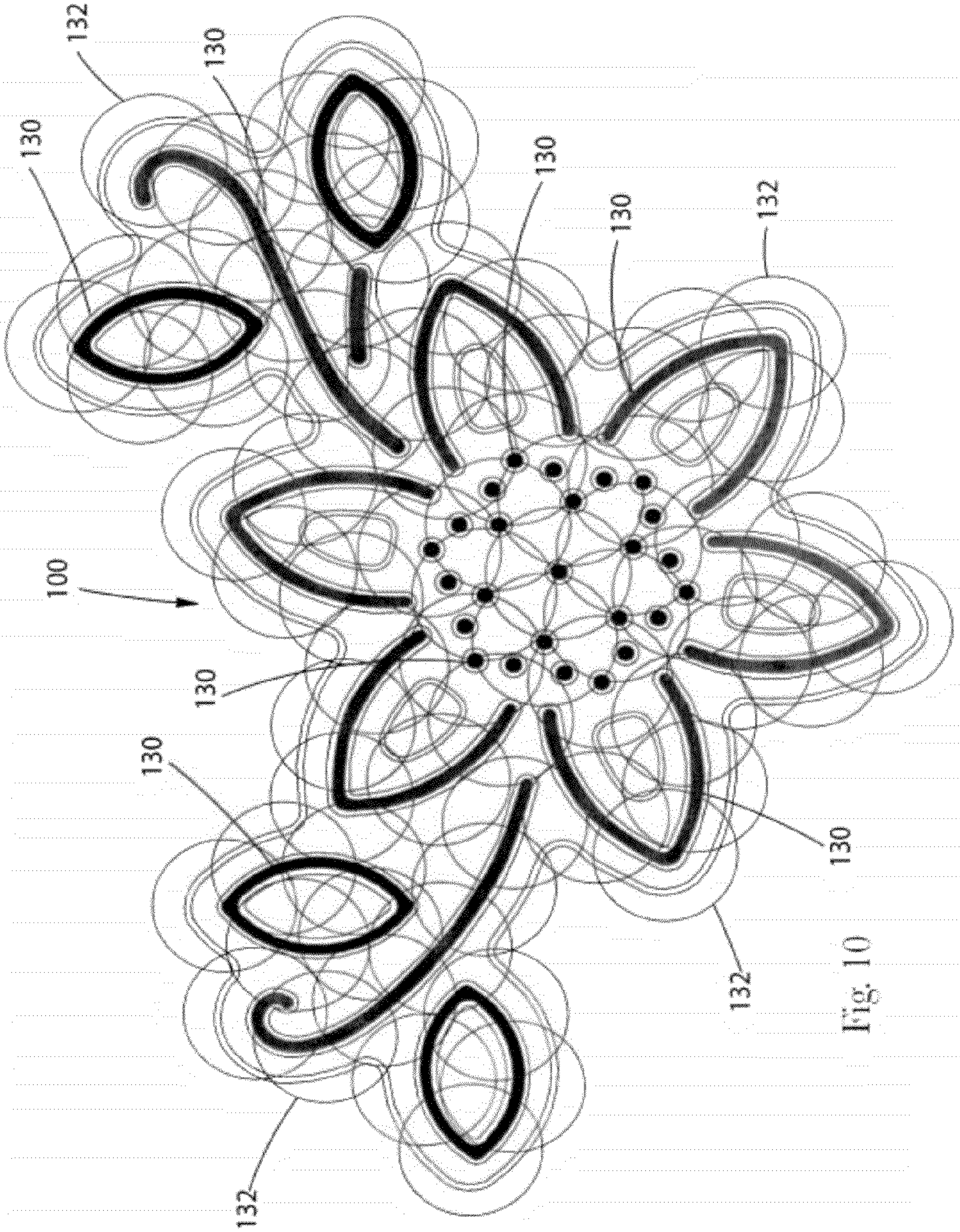
FIG. 10 is a top plan view of the layout of the respective grid points depicted in FIG. 9 showing the process for equilibrating the location of the respective grid points with the emboss pattern of FIG. 5; and, FIG. 11 is final placement of the respective grid points disposed upon the emboss pattern shown in FIG. 5.

Next, as shown in FIG. 10 after translated vertices 130 have been positioned relative to embossing pattern 100, a circle 132 each having a radius, r, is drawn relative to each vertex 130 position (including translated and non-translated vertices). The radius, r, is equal to the distance between adjacent vertices 112 of grid 110.

Once all circles 132 are placed relative to all translated vertices 130, the next step is to verify, if any two adjacent translated vertices 130 is separated by at least the distance r. This starts from the center of the embossing pattern 100 and goes outwards in direction to any secondary elements.

If the distance between adjacent translated vertices 130 is less than r, the particular outer translated vertex 130 relative to the center of the embossing pattern 100 is moved outwardly away from the center of embossing pattern 100. The particular translated vertex 130 is maintained in contact with the particular portion of the embossing pattern 100 until the distance r between adjacent translated vertices 130 is reached. This step is repeated for all translated vertices 130 until all translated vertices 130 are separated by the distance r.

Figure 11:
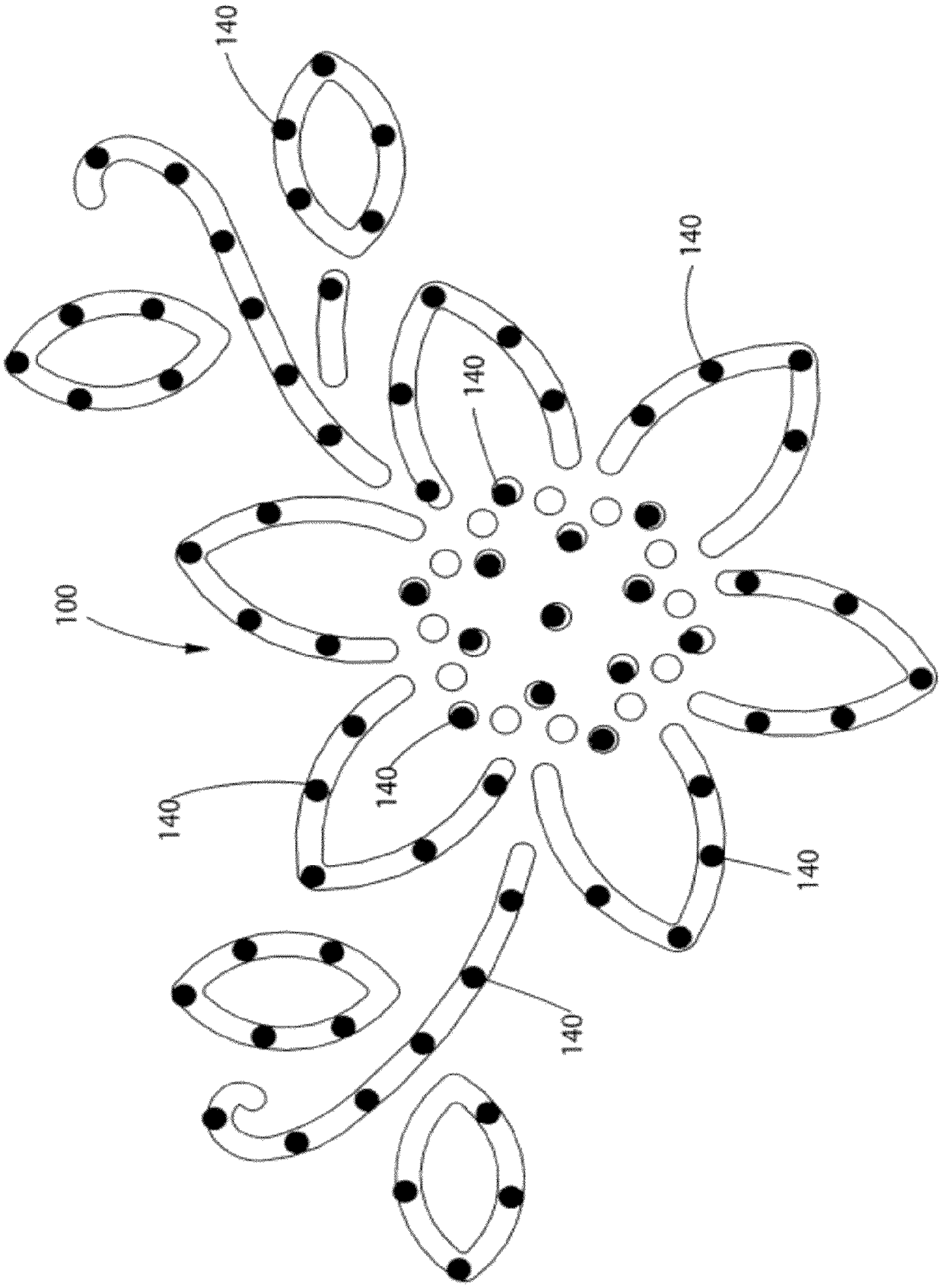

FIG. 11 shows the final pattern for placement of adhesive upon the embossments of the pattern as shown based upon the use of grid 110 comprising vertices 112 (now finally placed vertices 140). The resulting end point of the various finally placed vertices 140 indicates where an adhesive composition can be placed upon the embossments in a web substrate that provides for an optimized placement for increased adhesion between the plies of the multi-ply substrate and increased softness of the multi-ply substrate. Concurrent with the placement of adhesive upon the embossments and the resulting strength provided to the resulting multi-ply substrate is a realized reduction in the quantity of adhesive required to provide bonding both necessary and sufficient to maintain the integrity of the plies within the final multi-ply substrate.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for placing an adhesive relative to an emboss pattern disposed upon a first ply of web material to form an adhesively bonded multi-ply substrate, the process comprising the steps of:

providing said emboss pattern as a pattern of elements;

providing a grid comprising a plurality of vertices, said grid corresponding to a first adhesive application pattern;

providing each vertex of said plurality of vertices with an initial position; and, overlaying said emboss pattern upon said grid;

translating a first vertex of said plurality of vertices proximate to a first element of said pattern of elements from said initial position to a second position overlaying said first element of said pattern of elements, and;

disposing said adhesive upon said embossment at said second position and superposing said first ply into contacting engagement with a second ply to form said multi-ply substrate.

2. The process of claim 1 further comprising the step of translating a second vertex of said plurality of vertices proximate to said first element of said pattern of elements from said initial position to a second position overlaying said first element of said pattern of elements.

3. The process of claim 2 further comprising the step of comparing a distance between said first vertex and a second vertex.

4. The process of claim 3 further comprising the step of translating said second vertex to a third position overlaying said first element of said pattern of elements if said distance between said first vertex and a second vertex is less than a circle having a radius, r, disposed about said first vertex.

5. The process of claim 1 further comprising the step of translating said first vertex of said plurality of vertices in a direction corresponding to an axis forming a Cartesian coordinate system.

6. The process of claim 5 further comprising the step of translating said first vertex of said plurality of vertices in a direction corresponding to any combination of axes forming a Cartesian coordinate system.

7. The process of claim 1 further comprising the step of translating said first vertex of said plurality of vertices to a terminus of an element of said pattern of elements.

8. The process of claim 1 further comprising the step of comparing a distance between said first vertex and a second vertex of said plurality of vertices disposed adjacent said first vertex and overlaying said first element of said pattern of elements.

9. The process of claim 8 further comprising the step of translating said second vertex to a third position overlaying said first element of said pattern of elements if said distance between said first vertex and a second vertex is less than a radius, r, of a circle disposed about said first vertex.

10. The process of claim 1 further comprising the step of translating a second vertex of said plurality of vertices proximate to a second element of said pattern of elements from said initial position to a second position overlaying said second element of said pattern of elements.

11. The process of claim 10 further comprising the step of comparing a distance between said first vertex and a second vertex.

12. The process of claim 1 further comprising the step of translating said second vertex to a third position overlaying said second element of said pattern of elements if said distance between said first vertex and a second vertex is less than a radius, r, of a circle disposed about said first vertex.

13. A process for placing an adhesive relative to an emboss pattern, said process being suitable for forming an embossed multi-ply substrate, the process comprising the steps of:

providing said emboss pattern as a pattern of elements;

providing a grid comprising a plurality of vertices, said grid corresponding to a first adhesive application pattern;

providing each vertex of said plurality of vertices with an initial position;

translating a first vertex of said plurality of vertices proximate to a first element of said pattern of elements from said initial position to a second position overlaying said first element of said pattern of elements in a first direction corresponding to an axis forming a Cartesian coordinate system;

translating a second vertex of said plurality of vertices proximate to said first element of said pattern of elements from said initial position to a second position overlaying said first element of said pattern of elements in a second direction corresponding to an axis forming a Cartesian coordinate system;

comparing a distance between said first vertex and a second vertex of said plurality of vertices disposed adjacent said first vertex and overlaying said first element of said pattern of elements;

translating said second vertex to a third position overlaying said first element of said pattern of elements if said distance between said first vertex and a second vertex is less than a radius, r, of a circle disposed about said first vertex; and, disposing said adhesive upon said pattern of elements from said first and third positions.

14. The process of claim 13 further comprising the step of providing said first direction orthogonal to said second direction.

15. A process for placing an adhesive relative to an emboss pattern, said process being suitable for forming an embossed multi-ply substrate, the process comprising the steps of:

providing said emboss pattern as a pattern of elements;

providing a grid comprising a plurality of vertices, said grid corresponding to an adhesive application pattern;

providing each vertex of said plurality of vertices with an initial position;

translating a first vertex of said plurality of vertices proximate to a first element of said pattern of elements from said initial position to a second position overlaying said first element of said pattern of elements;

translating a second vertex of said plurality of vertices proximate to a second element of said pattern of elements from said initial position to a second position overlaying said second element of said pattern of elements;

comparing a distance between said first vertex and a second vertex of said plurality of vertices disposed adjacent said first vertex and overlaying said second element of said pattern of elements;

translating said second vertex to a third position overlaying said second element of said pattern of elements if said distance between said first vertex and a second vertex is less than a radius, r, of a circle disposed about said first vertex; and, disposing said adhesive upon said pattern of elements from said first and third positions.

16. The process of claim 15 further comprising the step of translating said first vertex in a first direction corresponding to a first axis forming a Cartesian coordinate system.

17. The process of claim 16 further comprising the step of translating said second vertex in a second direction corresponding to a second axis forming a Cartesian coordinate system.

* * * * *